Jan. 15, 1963   R. M. ANDERSON ETAL   3,073,429
ARTICLE TRANSFER ARRANGEMENT
Filed April 20, 1961                      2 Sheets-Sheet 1

INVENTORS
Robert M Anderson
Beecher V Dees
by
ATTORNEY

Jan. 15, 1963  R. M. ANDERSON ETAL  3,073,429
ARTICLE TRANSFER ARRANGEMENT
Filed April 20, 1961  2 Sheets-Sheet 2
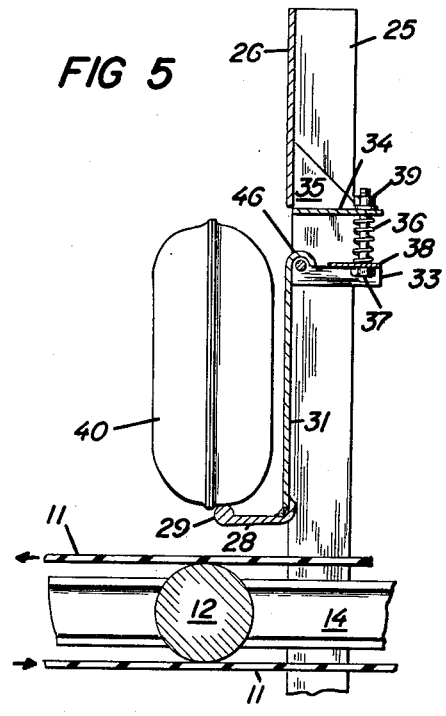
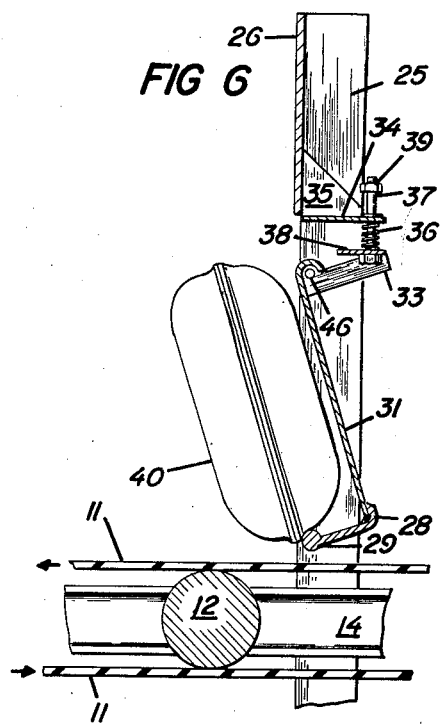
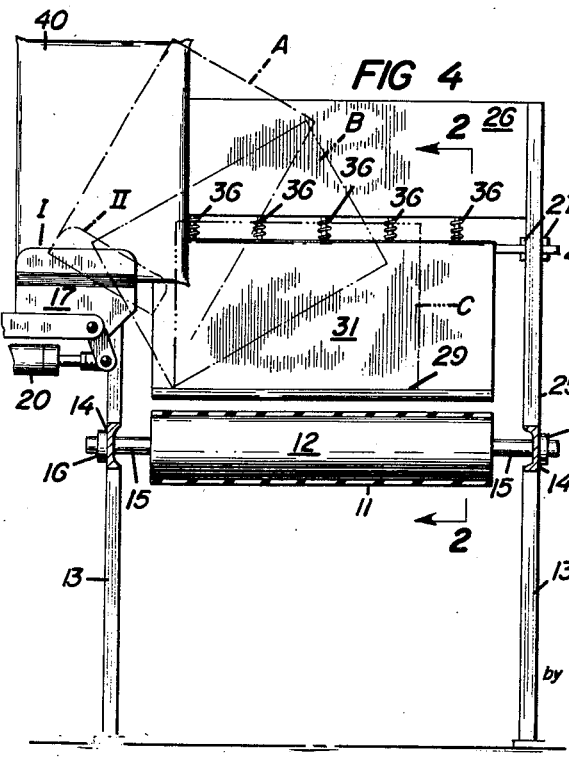
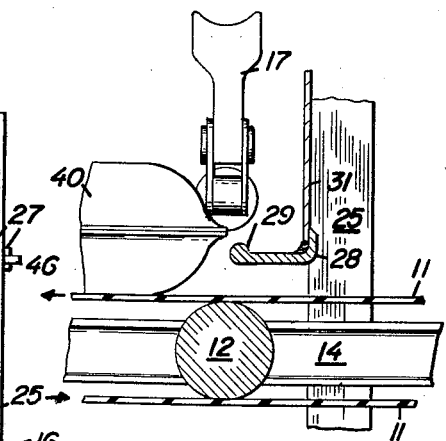
INVENTORS
Robert M Anderson
Beecher V Dees
by
ATTORNEY

United States Patent Office 3,073,429
Patented Jan. 15, 1963

3,073,429
ARTICLE TRANSFER ARRANGEMENT
Robert M. Anderson and Beecher V. Dees, Houston, Tex., assignors to United Carbon Company, Inc. (Maryland), Houston, Tex., a corporation of Maryland
Filed Apr. 20, 1961, Ser. No. 104,459
9 Claims. (Cl. 198—20)

This invention relates broadly to arrangements for uniformly positioning a series of articles on a conveyer in connection with their transfer thereto. More particularly it relates to means for the reception of one or more articles being transferred from a source to a conveyer, said means being adapted to uniformly topple the received articles in such a manner that uniformity of placement on the conveyer is achieved.

Since the invention hereinafter described is adapted to handle many different types of objects, such as bagged material, unpackaged solid objects, single rigid containers, containers in groups and other types of objects, all of the above will hereinafter be generically designated by the term "unit" for the sake of simplicity and brevity.

In automatic systems for the manufacture, manipulation, packaging, transfer and storage of materials and objects, there is frequently a need for moving units from a source to a main conveyer. The source may be another conveyer, a packaging machine, a printing machine, a molding machine or any one of countless other types of devices. Frequently, because of the nature and requirements of certain operations which are to be performed on the units subsequent to their transfer from the source to the conveyer, it is desirable that each of the units come to rest upon the conveyer in the same position and attitude as all other units being transferred. Meeting the requirement of uniform transfer is sometimes quite difficult. This is especially true when the attitude of the unit as discharged from the source differs substantially from the attitude in which it is desired to have the unit rest upon the conveyer. For instance, in a bag-filling operation, a main conveyer is frequently fed by a plurality of bag-filling machines, each of which fills empty bags, seals them and discharges them in an upright attitude. As bags leave the several filling machines they must be transferred to the main conveyer belt. While on the main belt, the filled bags are sometimes printed with identifying indicia. In some packaging operations bags are grouped on or at the end of the main conveyer for palletizing or possibly for insertion in shipping containers capable of holding several bags.

The printing, palletizing and/or insertion of several units into a common shipping container are all operations which cannot be performed efficiently with any degree of uniformity unless all the units being operated upon approach said operations while resting upon the moving conveyer in similar attitude and positions. The problem becomes somewhat difficult when the units discharged from the source have a printed side and an unprinted side and there is a need to have all the units come to rest upon the conveyer with the unprinted side facing downwards. It is not possible to fill such a need by merely allowing the units to topple from the source to the conveyer and then rely on converging guide rails or other similar devices to correctly position the units upon the conveyor. Assuming that the units are discharged from the source with the printed side of each unit facing in the same direction, there is still no guarantee that all will land on the conveyer with the printed side up, since the bag is liable to fall onto either of its sides in a random fashion when it topples onto the conveyer. It is to be observed that the problem is one of both turning a unit during transfer from the source and positioning it on the conveyer belt.

The turning of units, whether in connection with transfer from a source to a belt or not, has usually been achieved by means of a bar or similar device placed across the conveyer in the path of packages moving thereon. An upright, moving package, colliding with the stationary bar, is rolled backward as it travels beneath the bar, causing that side of the package which was formerly the trailing side to face downward after turning. This method of turning makes it impossible to place the packages on the conveyer with the former trailing side facing up. This brings about an unecessary inflexibility in the planning and arrangement of conveyer systems, multi-conveyer systems and conveyer-transfer systems.

Therefore the objects of this invention include:
(1) The provision of means for placing units on a moving conveyer in a definite position;
(2) The furnishing of apparatus for turning one or more units in space during their transfer to a conveyer;
(3) The provision of a device for the reception of units discharged from a source and for causing said units to topple from a vertical attitude to a horizontal attitude in such a manner that the same side of all the units so received and toppled face upwards when said units come to rest on the conveyer;
(4) The provision of means for governing the automatic transfer of bags of material from an upright attitude in which they are discharged from a source to a conveyer whereby each bag is caused to come to rest in a horizontal attitude with a selected side facing upwards; and
(5) The furnishing of apparatus for turning units during the course of their transfer from a source to a conveyer so that the side of said unit which was the trailing side during its discharge from the source does not face downwards when the unit comes to rest upon the conveyer.

Other objects and advantages of this invention will be apparent to those skilled in the art after a consideration of this disclosure.

The objects of this invention are achieved by a unit transfer arrangement comprising:
(a) Supporting framework for maintaining said unit transfer arrangement in unit receiving position with respect to a source and in spaced apart relationship with the load-bearing portion of a conveyer;
(b) Unit catching means borne by said framework in rockable relationship therewith over said conveyer, said unit catching means being provided with a generally horizontal member to at least partially arrest the motion of a unit discharged from said source and to temporarily sustain said unit, said unit catching means being adapted to sway under the landing impact of said unit to a position in which it renders unstable support to said unit and encourages it to topple onto said conveyer;
(c) Steadying means cooperatively associated with said catching means and borne by said framework, said steadying means being adapted to prevent a unit temporarily sustained by said unit catching means from toppling in an undesired direction;
(d) Spring means operatively associated with said unit catching means to return said unit catching means from the position of unstable support to unit catching position subsequent to the toppling of said unit onto the conveyer.

The invention, as well as its attendant objects and advantages are illustrated by application of the inventive concepts to a specific embodiment, which is described hereinafter. Reference is made to the attached drawings, in which like numerals identify like parts throughout the several figures and in which sectional views are taken in the directions indicated by arrows on the section lines.

In the drawings:

FIGURE 4 is a front elevation of the unit transfer arrangement, conveyer unit and source. Dotted lines show the discharge movement of the source and the path of the unit in passing to the unit catching means;

FIGURES 5 and 6 are sectional views similar to FIGURES 2 and 3 illustrating the handling of a unit by the transfer apparatus;

FIGURE 7 is a fragmentary sectional view similar to FIGURE 2 showing a unit moving away from the transfer device.

In this embodiment of my invention, the source is the automatic discharge saddle of an automatic packer. The units are heavy paper packing bags filled with granular material.

Figure 1:
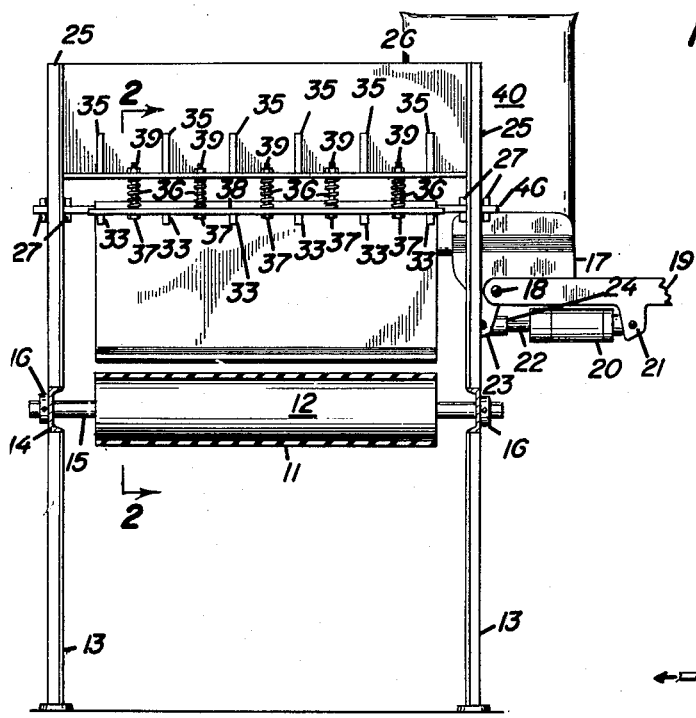
FIGURE 1 is a back elevation of a unit transfer arrangement constructed in accordance with the invention, showing a source and conveyer.

Reference is now made specifically to FIGURE 1 in which a conveyer belt 11 is borne by cylindrical roller 12, supported by vertical stanchions 13. Upon stanchions 13 are mounted longitudinal conveyer frame members 14. Shaft sections 15 projecting from roller 12 are journaled in suitable bearings 16 on the longitudinal conveyer frames 14.

Figure 2:
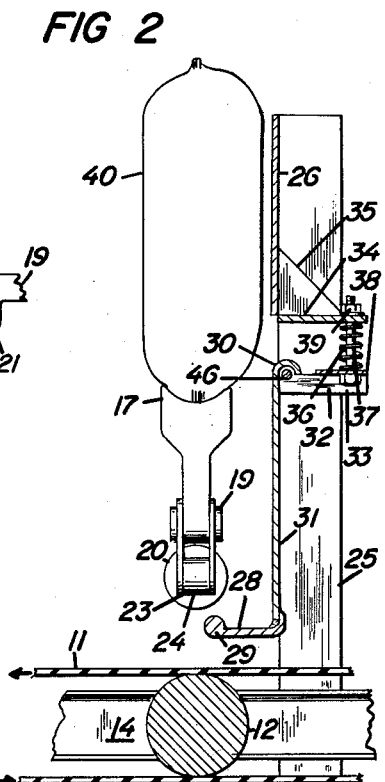
FIGURE 2 is an enlarged sectional view taken along 2—2 through the unit transfer device and shows a unit poised on the source.

Automatic ejection saddle 17 of an automatic bag packing machine not shown in full since it forms no part of this invention is pivotably mounted on a pintle 18 which is journaled in a pair of saddle-supporting frames 19, see also FIGURE 2. Motive power for the ejection saddle is provided by a retracting air cylinder 20 secured to shoulders 21 on frames 19. Its plunger 22 is attached through a gudgeon 24 to short levers 23 which are fixed to saddle 17 so that the upper end of each lever is centered about pintle 18. When the plunger 22 of air cylinder 20 is retracted to the right by pressure from an air supply hose, not shown, saddle 17 pivots counterclockwise thereby dumping its contents onto the transfer device and thence to the conveyer. A compression spring, not shown, within the cylinder 20 returns the saddle 17 to its normal level attitude after the air pressure in the cylinder is exhausted.

For supporting framework, it is necessary only to provide a pair of posts 25 upon the longitudinal conveyer frame members 14. The posts 25 may be bridged by a plate 26 which rigidifies the framework and may incidentally serve as a guide from time to time in the event that units discharged from the saddle 17 deviate from the desired "toppling" path. Also journaled in the posts 25 is a transverse shaft 46 which is retained by transverse thrust collars 27. The shaft 46 serves as a pivotable support for the unit steadying and catching means hereinafter described.

The steadying means is a plate 31, generally vertically disposed and, like the unit catching means, may be fabricated of sheet metal and/or from other suitable materials such as wood, plastic and reinforced plastic. The upper portion of plate 31 is bent into a semi-circular channel 30 within which are lodged a plurality of inserts 32 having backwardly projecting buffer arms 33 formed integrally thereon. The inserts 32 are fastened into the channel 30 quite securely, preferably by welding, and are apertured to receive the shaft 46. The plate 31 pivots within the framework upon said shaft 46.

Throughout the specification and claims, the terms "backwardly" and "forwardly" are used with reference to the position of various objects as compared with the direction of movement of the conveyer. For instance, the above-mentioned buffer arms 33 are said to project backwardly from the inserts 32; that is to say in the opposite direction from the direction towards which the conveyer travels. Throughout the various views, the conveyer is traveling from right to left.

To the lower portion of plate 31 is secured the unit catching means, or catcher 28. The catcher 28 projects generally forwardly of the plate 31 in a horizontal attitude in order that it may receive units from the source which also is generally forward of plate 31. It is preferable to provide some sort of lip 29 on the leading edge of the catcher to prevent premature slippage of a unit from the catcher to the conveyer. Although the need for a lip 29 does not exist in all the various possible applications of our invention, it has been found that in this particular embodiment, the presence of lip 29 lessens the tendency for units to topple off of the catcher in the wrong direction. In lieu of a lip, the upper surface of the catcher 28 might be provided with rubber friction pads, ridges or other friction means.

Extending from one of the posts 25 to the other of said posts is spring mount 34. Spring mount 34 is disposed horizontally above the conveyer and catcher and at the same general elevation as the bottom edge of plate 26 to which it may be secured by angle braces 35. Braces 35 tend to bind spring mount 34 into a rigid unit with posts 25 and plate 26 in order that said mount may absorb shocks received by it from the operation of the springs 36.

Springs 36 are maintained in a compressed condition between spring mount 34 and buffer plate 38 by retaining bolts 37. Each of said bolts extends through a hole in buffer plate 38, one of said springs 36, a corresponding hole in spring mount 34 and is secured by a suitable nut 39. By means of the nuts 39, the bolts 37 may be drawn upwards against the action of the springs 36 to compress each to a uniform extent. Springs 36, spring mount 34, buffer plate 38 and the retaining bolts 37 therefor constitute a shock absorber and return means for the unit catcher 28 and steadying plate 31. Said unit catcher and steadying plate act upon the shock absorbing assembly by means of the buffer arms 33 which extend backwardly from the upper portion of steadying plate 31 and beneath the buffer 38.

Figure 3:
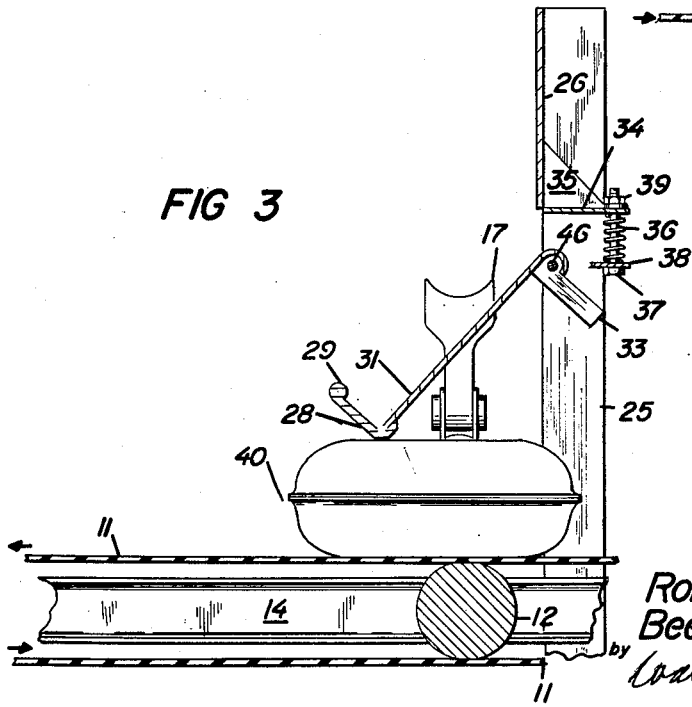
FIGURE 3 is a sectional view similar to FIGURE 2 and shows the manner in which the unit transfer arrangement is able to pivot out of the way of units placed upon the conveyer by other sources.

One advantage of the instant invention is that it can be used in cooperation with a conveyer carrying units discharged from other sources further up the conveyer belt. Units discharged from other sources will approach the steadying plate and unit catcher assembly from the rear as shown in FIGURE 3. When this occurs, said assembly will simply pivot forwardly and upwardly to allow the oncoming unit to pass by. When the unit has cleared said assembly, it will return to the position shown in FIGURE 7, standing ready to receive a unit from saddle 17 or to allow additional units to pass beneath on their way down the conveyer. Suitable coordination means can be provided to insure that the saddle 17 does not discharge when the unit catcher is in the position shown in FIGURE 3.

Having described the various parts of this embodiment of the invention, reference is now made to FIGURE 4 for a description of its operation. A unit 40 is shown in place upon the saddle 17, ready for discharge. The designation "II" represents the position of the saddle 17 after it has moved from its normal position "I" to its unit discharge position by air cylinder 20. Designations A, B and C illustrate the sequential movement of the unit from the instant of discharge (A) from the saddle, to an intermediate "in-flight" position (B) and finally to the first contact (C) of the unit with the unit catching means 28. To review then, when air cylinder 20 dumps the saddle 17 from position I to II, the unit 40 is discharged through the positions designated by A, B and C and makes an initial contact with the unit catching means 28, as is seen in FIGURES 4 and 5. FIGURE 5 illustrates the position of unit 40 at the same point in time as is shown by the position C in FIGURE 4.

Once initial contact of the unit has been made as shown in FIGURE 5, the impetus of the unit 40 starts a counterclockwise or backward movement in the unit catching means 28 about the shaft 46. Initially, the unit 40 moves in unison with the backwardly moving unit catching means. However, as the unit catching means 28 moves towards the position shown in FIGURE 6, a point is reached at which no part of the unit catching means 28 remains directly beneath the center of gravity of unit 40. At such point, the unit is in an unstable condition. Since the steadying plate 31 leaves no opportunity for the unit to topple backwards, it can only topple forwards. When the unit catching means has reached the position shown in FIGURE 6, the unit has already begun to topple forward onto the conveyer 11. The side of the unit which was the trailing side in the unit filling operation now becomes the leading side of the unit as it falls upon the conveyer.

After the unit comes to rest upon the conveyer 11, with the side which was formerly trailing now being the leading side it will, of course, move with the conveyer. As the unit moves on down the conveyer, the unit catching means is returned to its unit catching position as shown in FIGURE 7 with the aid of the springs 36, acting through buffer 38, buffer arms 33, inserts 32 and the steadying plate 31. The operation of the device upon a single unit has now been completed. The operation as explained above is repeated again and again in continuous production.

It will be obvious to those skilled in the art that various modifications can be made in this specific embodiment without departing from the spirit of our invention. Therefore, it should be understood that the various details used in the above description are given only for the purpose of satisfying the requirement of describing a specific embodiment of our invention and should not be construed as limiting the appended claims unnecessarily.

We claim:

1. Apparatus for assisting in the controlled transfer of a unit between a source and a conveyor characterized by the following features:
   (a) at least one support member;
   (b) substantially vertical unit steadying means pivotably secured to said support member;
   (c) substantially horizontal, rockable unit catching means borne by said unit steadying means and projecting forwardly of the lower portion of said unit steadying means;
   (d) shock absorbing means secured to a rigid structural member such as said support member;
   (e) at least one buffer arm cooperatively associated with said unit catching means and said unit steadying means for engaging said shock absorbing means;
   (f) whereby said shock absorbing means exerts force through said buffer arm on said unit catching means to urge said unit catching means toward its unit receiving position, to partially absorb and exert a counterthrust against the impact of a unit falling upon said unit catching means, and to return said unit catching means to its unit receiving position after said unit catching means has rocked backwardly against the action of said shock absorbing means and under the force of the impact of said unit to topple said unit forwardly onto said conveyer.

2. Apparatus according to claim 1 further provided with an upwardly disposed lip on the leading edge of said unit catching means.

3. Apparatus according to claim 1 further provided with a shaft journaled in said support member for supporting said unit steadying means.

4. Apparatus according to claim 3 further provided with inserts secured within a channel formed in the upper portion of said unit steadying means, said inserts being apertured to receive said shaft member.

5. Apparatus according to claim 1 wherein the source is the discharge means for an automatic packaging machine and the unit is a loaded bag.

6. Apparatus for assisting in the controlled transfer of a unit between a source and a conveyor, characterized by the following features:
   (a) support means, including a transverse beam above said conveyor;
   (b) transverse shaft means secured to said support means;
   (c) a generally vertical steadying plate pivotally mounted on said shaft, transversely of said conveyor, said steadying plate having a lower edge generally parallel to the load-bearing surface of said conveyor and spaced upwardly therefrom;
   (d) a generally horizontal catching plate secured to said lower edge and projecting forwardly therefrom over said conveyor;
   (e) a generally horizontal buffer arm secured to said steadying plate and projecting rearwardly therefrom;
   (f) spring means engaging said beam and said buffer arm, said spring means being adapted to maintain said steadying plate in its generally vertical attitude normally, to permit said steadying plate to pivot forwardly, and to cushion the rearward pivoting of said steadying plate in response to the impact of a unit falling onto said catching plate.

7. Apparatus according to claim 6 wherein said spring means includes a plurality of coil springs and a buffer plate for engaging said buffer arms, said springs being disposed between said beam and said buffer plate for compression therebetween when said steadying plate pivots rearwardly from its normal, generally vertical position.

8. Apparatus according to claim 6 additionally provided with an upwardly disposed lip on the leading edge of said catching plate.

9. Apparatus for assisting in the controlled transfer of a unit between a source and a conveyor characterized by the following features:
   (a) support means;
   (b) substantially vertical unit steadying means;
   (c) substantially horizontal unit catching means secured to said steadying means to form an assembly having a cross-section generally corresponding to the shape of the letter L;
   (d) means for securing said assembly to said support means for pivotal movement with respect thereto between a unit dumping position and a normal position in which said catching means is generally horizontal and is elevated slightly above the load carrying surface of said conveyor;
   (e) shock absorbing means engaging said assembly and said support means for retarding the forced pivoting of said assembly to unit dumping position which results when a unit falls onto said catching means.

References Cited in the file of this patent

UNITED STATES PATENTS 1,784,273     Constable _____ Dec. 9, 1930

FOREIGN PATENTS 591,783     Canada _____ Feb. 2, 1960